United States Patent
Zulaski

[11] 3,859,564
[45] Jan. 7, 1975

[54] APPARATUS FOR DETECTING NEUTRAL DISPLACEMENT OF A POLYPHASE SYSTEM

[76] Inventor: John Andrew Zulaski, 5 N. Owen St., Mount Prospect, Ill. 60056

[22] Filed: Mar. 19, 1973

[21] Appl. No.: 342,541

[52] U.S. Cl. ............ 317/12 R, 317/12 B, 317/18 R
[51] Int. Cl. ............................................. H02h 7/16
[58] Field of Search .... 317/12 R, 12 A, 12 B, 18 R, 317/27 R

[56] References Cited
UNITED STATES PATENTS

| | | | |
|---|---|---|---|
| 2,309,433 | 1/1943 | Anderson | 317/27 R |
| 2,933,652 | 4/1960 | Cuttino | 317/27 R |
| 2,942,153 | 6/1960 | Schultz et al. | 317/12 B |
| 3,143,687 | 8/1964 | Hjertberg et al. | 317/12 R |
| 3,158,783 | 11/1964 | Minder | 317/12 B |
| 3,340,432 | 9/1967 | Ainsworth | 317/12 R |
| 3,348,097 | 10/1967 | Lemens | 317/12 R |

Primary Examiner—J. D. Miller
Assistant Examiner—Patrick R. Salce
Attorney, Agent, or Firm—Kirkland & Ellis

[57] ABSTRACT

A sensing device is connected to the neutral point of a polyphase system such as a wye capacitor bank connected to transmission lines of a 60 cycle AC three-phase electrical power system to provide a neutral displacement signal. Voltage sensing devices are connected to the transmission lines to measure the power system voltage unbalance, and also to provide a reference signal to compensate for the error voltages present at the neutral point caused by power system voltage unbalance and inherent unbalance resulting from variations in the manufacturing tolerances of the individual components of the polyphase system, e.g., the capacitors. The power system unbalance voltage signal and the reference signal are fed to compensating modules which isolate the signals, filter out harmonic frequencies and adjust the phase and amplitude of the signals to compensate for the error signals present at the neutral point. These compensating signals are then summed with the neutral displacement signal with a summing amplifier to eliminate from the neutral displacement signal those portions of that signal caused by power system unbalance and component tolerance unbalance so that the output of the summing amplifier accurately indicates the portion of the neutral displacement signal resulting from failure or inadvertent change of one or more of the components of the polyphase system. This output signal can then be utilized to trigger an appropriate warning system or an automatic switching device to disconnect the polyphase system from the power system if the neutral signal exceeds a predetermined level.

30 Claims, 14 Drawing Figures

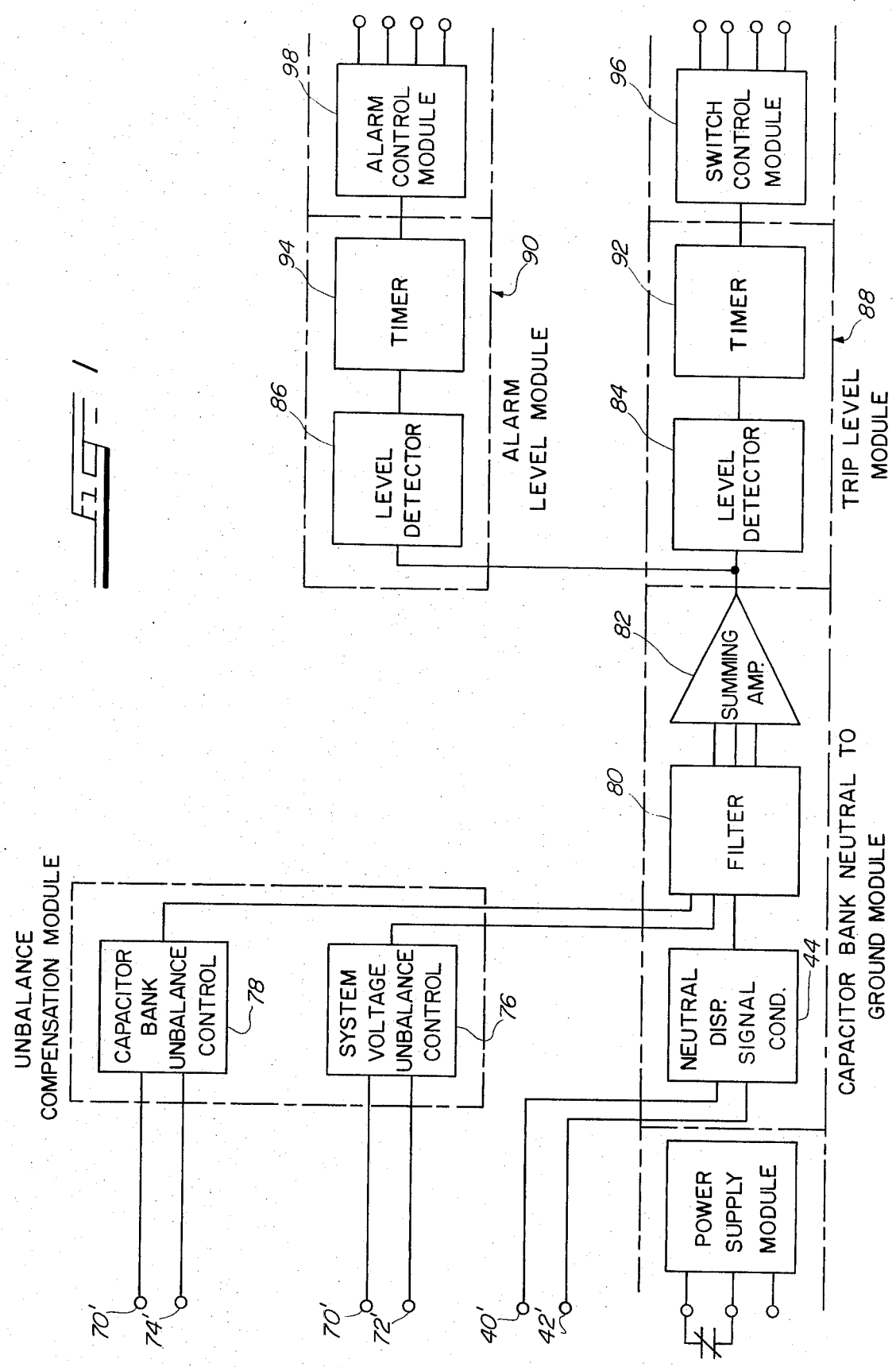

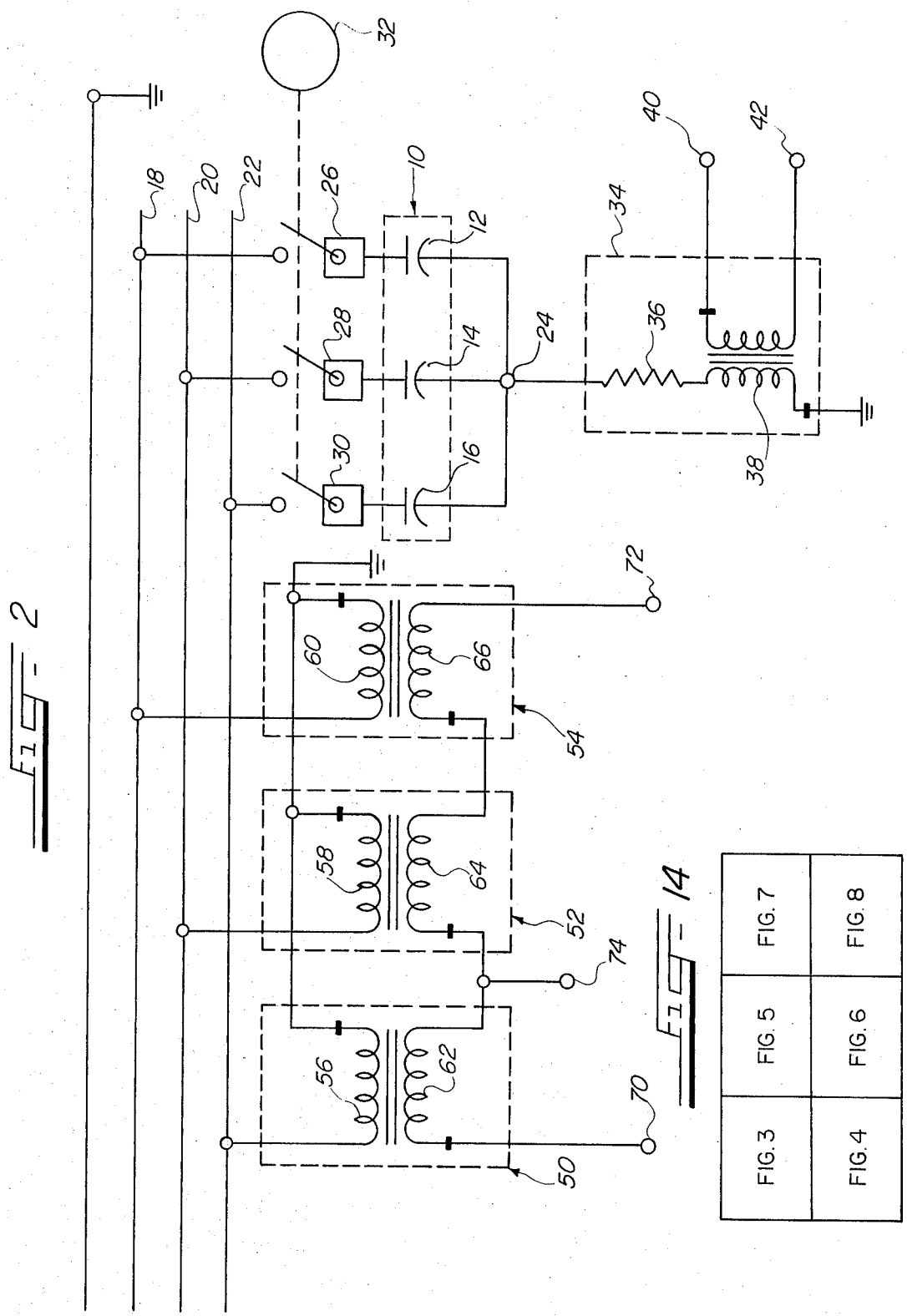

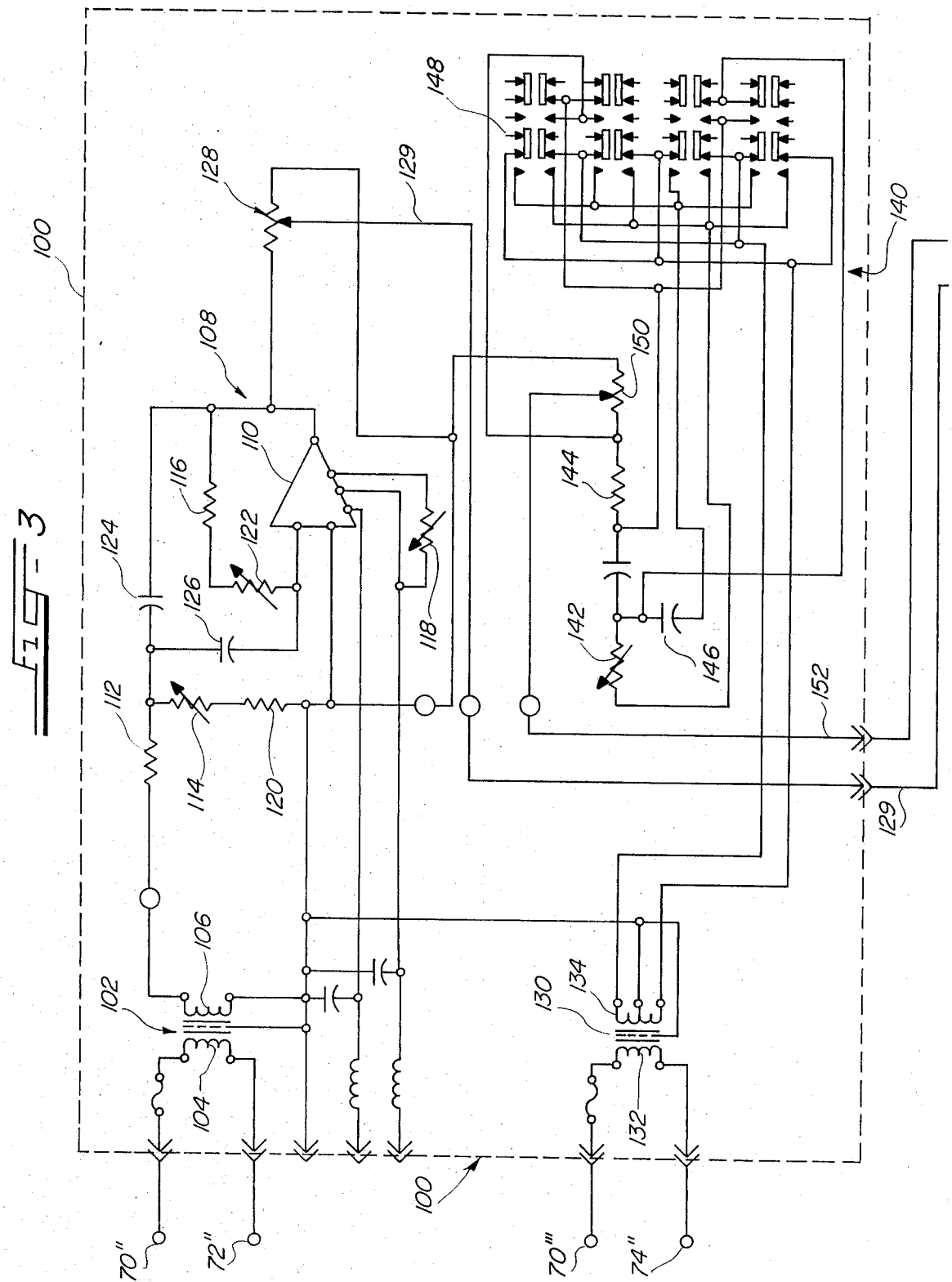

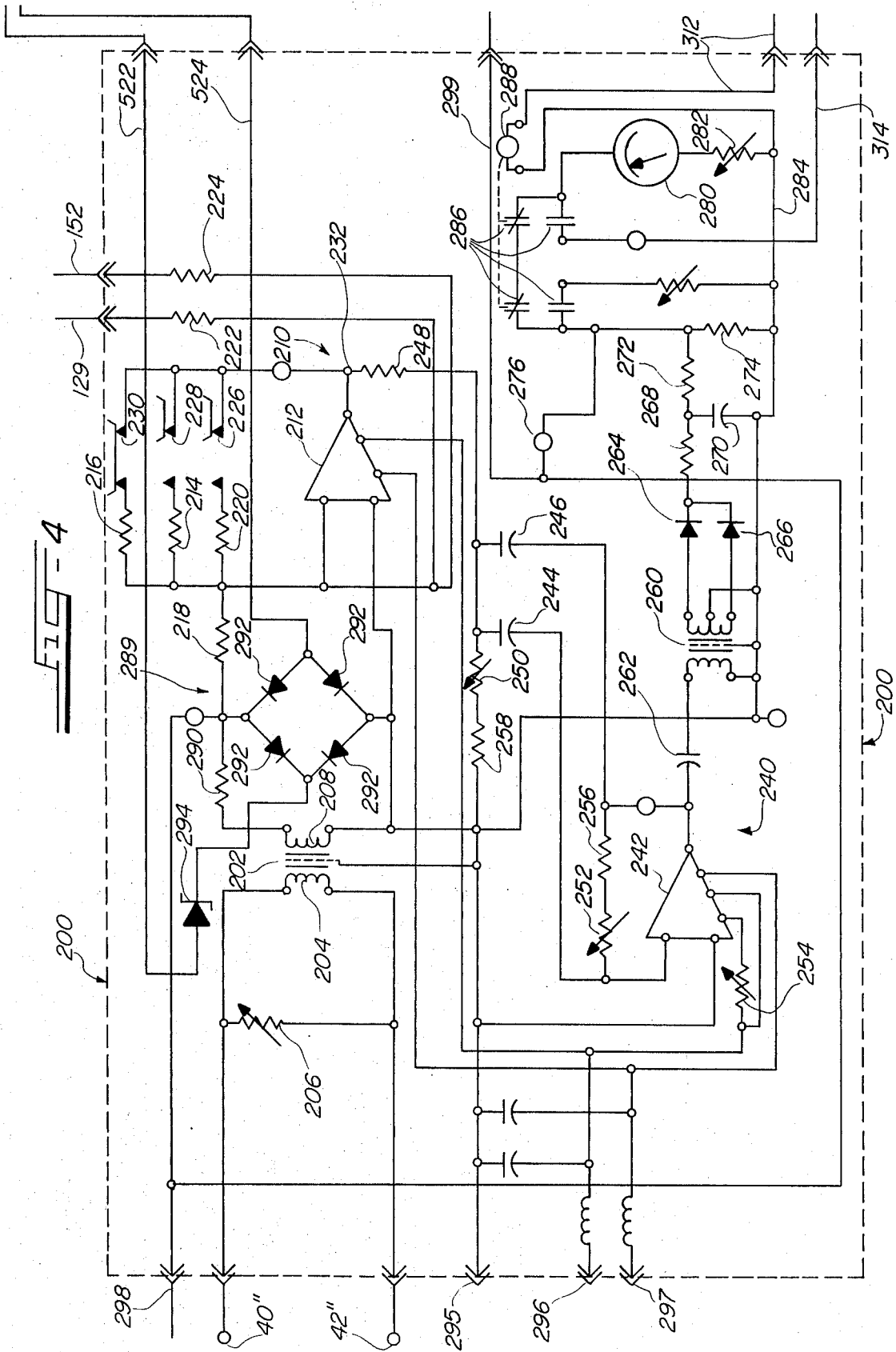

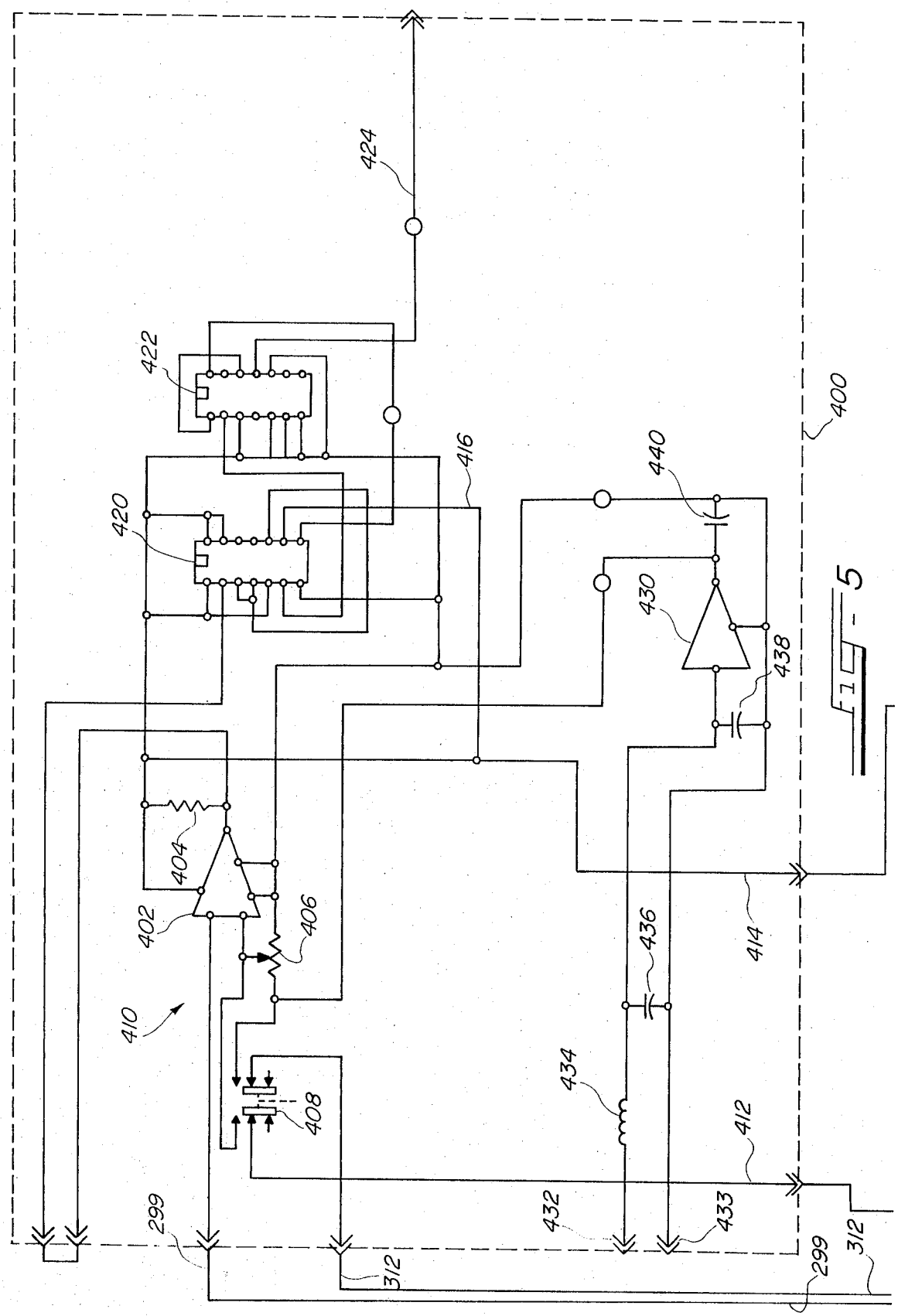

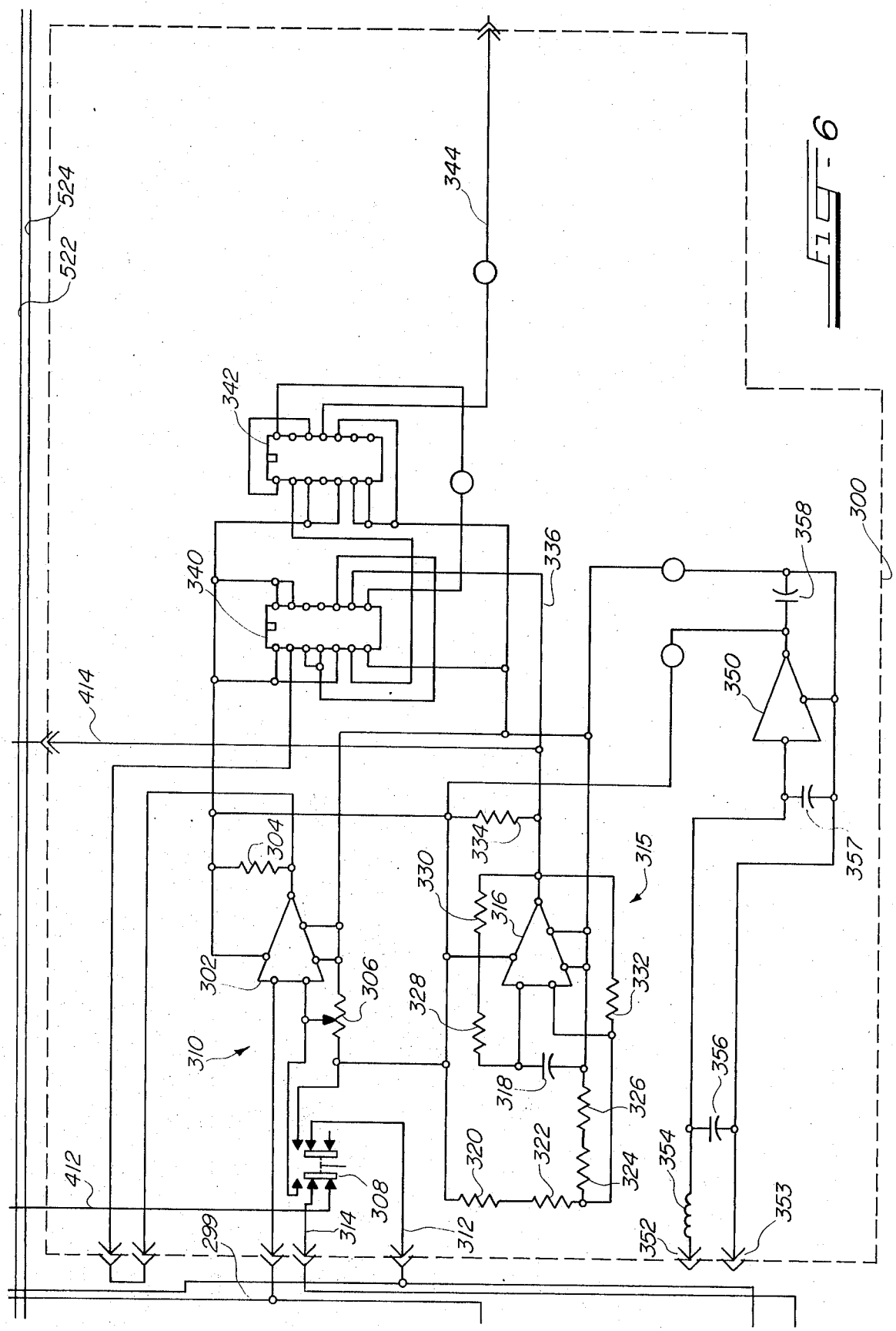

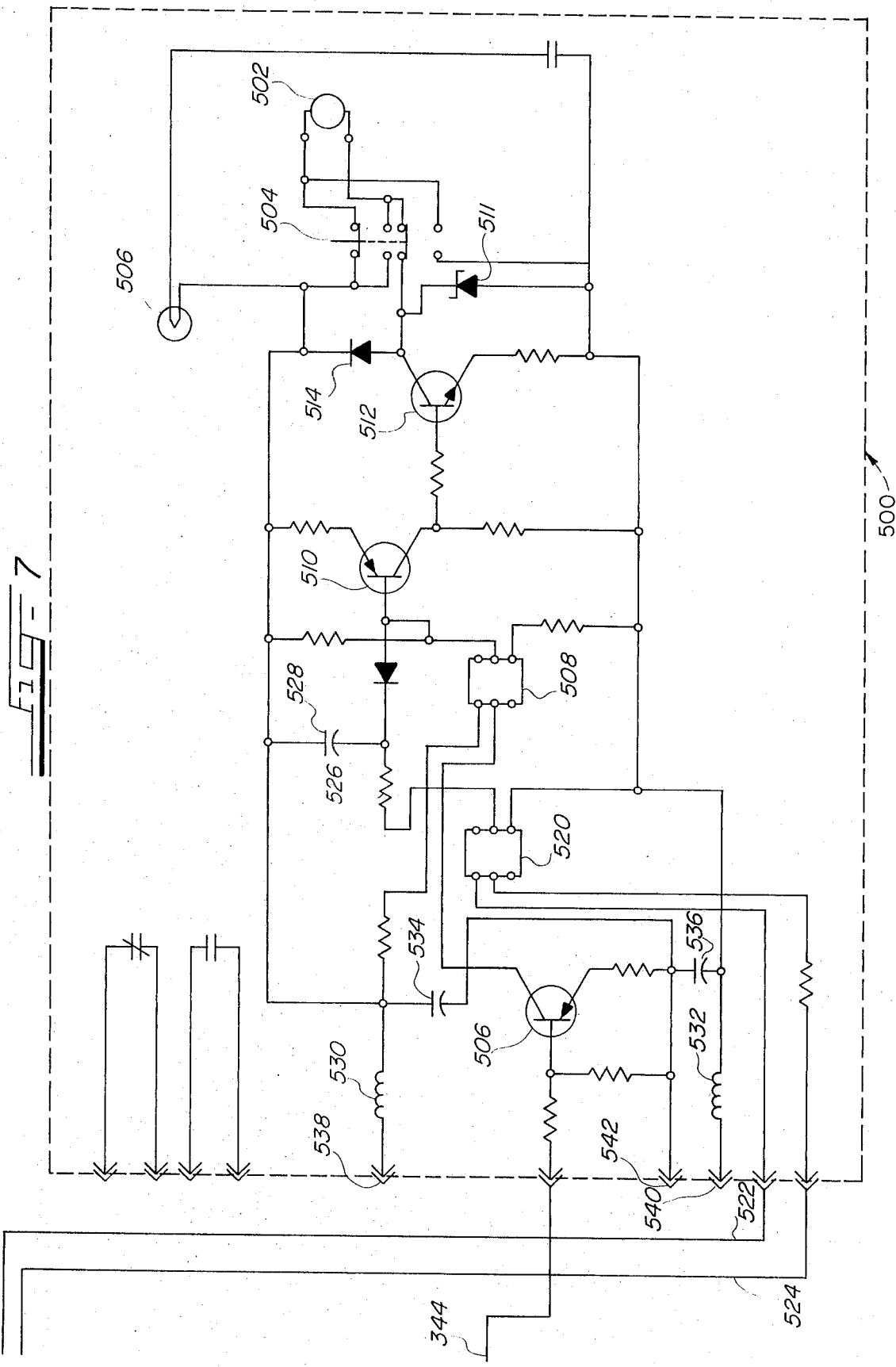

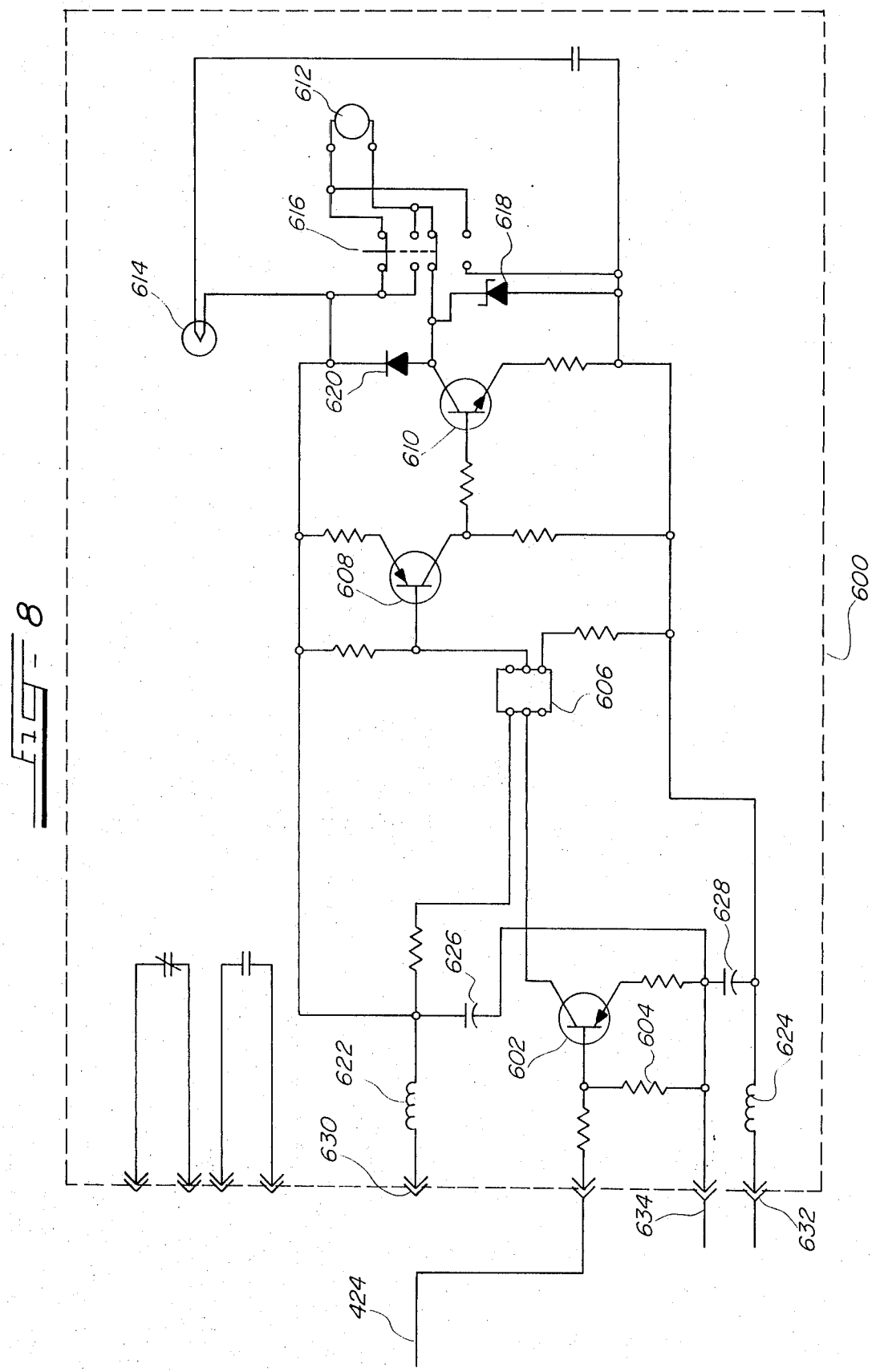

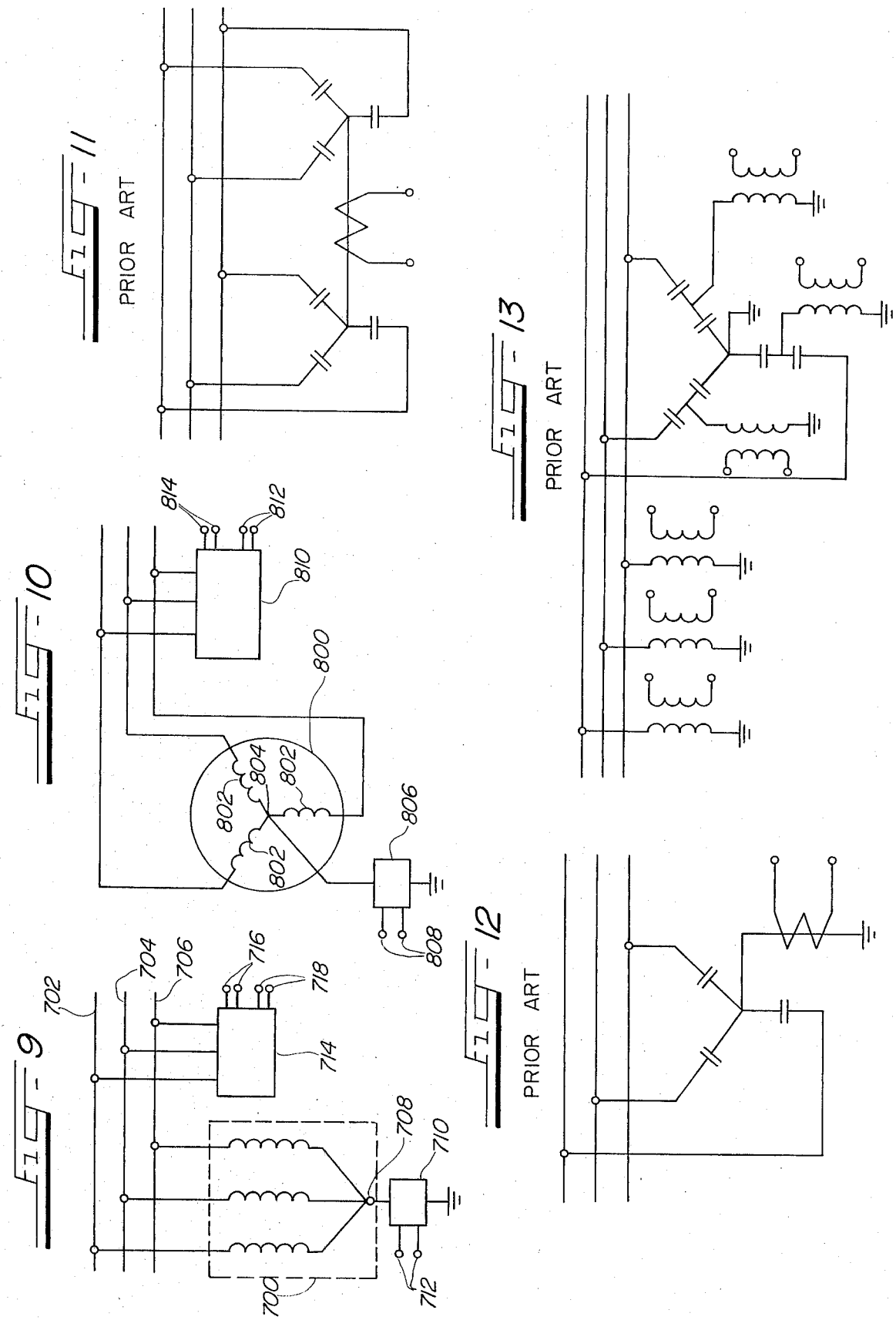

APPARATUS FOR DETECTING NEUTRAL DISPLACEMENT OF A POLYPHASE SYSTEM

BACKGROUND OF THE INVENTION

1. Field of the Invention

The present invention relates to apparatus for determining failure or inadvertent change of one or more components of a polyphase electrical system, and more particularly to an apparatus for determining failure of one or more capacitors in a multi-capacitor capacitor bank in a high voltage transmission system.

2. Description of the Prior Art

Various polyphase systems are used by electrical utilities in high voltage transmission systems.

For example, three-phase multi-capacitor wye capacitor banks are used by electrical utilities for power factor correction and voltage regulation of three-phase high voltage transmission systems. These capacitor banks are typically made up of a number of individual capacitor units connected in series and parallel combinations to form three groups of capacitors one side of each of which is connected to one of the three transmission lines of the three-phase high voltage transmission systems. The opposite side of each group of capacitors is connected at a neutral point. This arrangement is commonly known as a "wye" capacitor bank. Such capacitor banks are extremely beneficial in maintaining voltage, reducing losses, reducing operation costs, and delaying the need for building additional transmission lines.

However, several problems have been experienced by such capacitor banks, one of which is commonly known as a "cascading" failure. Typically, each capacitor in the bank is individually fused, and loss of a single capacitor with attendant fuse opening increases the impedance of that capacitor group thereby increasing the voltage across the group and increasing the possibility of failure of the remaining capacitors in the capacitor bank. This increased voltage, has, in some cases, caused sufficient over-voltage to result in complete failure of the remaining capacitors in the capacitor bank.

The sensitivity of capacitor units to overvoltage is well known. The life of a capacitor is essentially indefinite provided there is no application of voltage over the rated capacity of the capacitor. Typically, overvoltage of no more that 110 percent of the rated capacity of the capacitor will cause failure. Thus, loss of as few as one capacitor in a group of capacitors in a capacitor bank may be sufficient to increase the voltage on the remaining capacitors to a level sufficient to cause successive failures of the other capacitors. It is this "cascading" effect which makes the problem of detecting the loss of an individual capacitor unit important to the overall protection of the capacitor bank.

Many sensing systems and capacitor bank configuration designs have been utilized in an attempt to avoid the cascading effect by sensing the loss of individual capacitor units. One such prior art system is illustrated in FIG. 11, and this system utilizes a split ungrounded wye capacitor bank from which a control signal is derived by means of a current transformer connected between the neutral connections of each "half" of the capacitor bank. Essentially, this system utilizes two capacitor banks with a common neutral point. Loss of a single capacitor from either one of the two banks will cause current to flow between the neutral points which can be detected by the current transformer. An inherent advantage of this scheme is that it is unaffected by power system voltage unbalance. However, this system requires greater space and can produce capacitor unit fuse coordination problems due to a reduction of available fault current. Further, the split capacitor bank approach doubles the voltage increase imposed upon the remaining capacitors in a given section of the bank when a failure results, thus leaving no margin for a warning system. Consequently, the capacitor bank must be immediately removed from the system upon failure of any of the individual capacitors. Further, this system provides no means for compensating for error currents between the neutral points resulting from capacitor tolerance errors.

Another approach to the cascading failure problem is to utilize smaller capacitor units in an effort to tolerate loss of more than one unit where the bank is split. Such an approach is grossly uneconomical because of the increased expense of utilizing smaller capacitor units. Consequently, this approach has been recognized as not economically feasible.

A means of protecting grounded wye capacitor banks has been by use of a current transformer to sense the current from the neutral point to ground as illustrated in FIG. 12. However, energization of grounded wye capacitor banks is unavoidably accompanied by extremely high in-rush currents between the bank neutral and ground, particularly where parallel banks are already energized. Such in-rush currents can be on the magnitude of thousands of amperes, and adequate surge protection of the current transformer itself and the sensing equipment connected to the secondary of the sensing transformer is expensive and difficult to achieve.

As an alternative, the use of three voltage sensing devices connected between series capacitors in the capacitor bank as illustrated in FIG. 13 has been successful, but the cost of such an approach can only be justified in extremely large capacitor banks.

Finally, some users have applied capacitor units of less than their rated voltage in order to avoid overvoltage stresses, and thus, lengthen the capacitor unit life even with one or more units removed from service. Such undervoltage application is costly because a capacitor's reactive effect is a function of the square of the applied voltage. For example, a capacitor unit operating at 90 percent of its rated voltage capacity only yields 81 percent of its rated KVAC capacity. Thus, this approach cannot be justified economically.

Additional problems incident to prior art devices utilized to detect failure of one or more capacitors in a capacitor bank has been the inability of the prior art devices to distinguish between that portion of the neutral displacement voltage or current caused by either power system voltage unbalance or manufacturing tolerance errors in the individual capacitors in the capacitor bank from that portion of the neutral displacement voltage or current caused by failure of one or more of the capacitors. In larger capacitor banks, extraneous voltages can introduce significant errors or even obscure the signal created by loss of an individual capacitor unit. Typically, a constant error signal is present at the neutral point due to capacitor bank inherent unbalance resulting from manufacturing tolerance differences among the individual capacitor units or due to system voltage unbalance caused by nontransposition of conductors in overhead lines. Further, an error vector caused by system load unbalance can vary in both phase angle and amplitude due to changing load conditions. Thus, it would be a highly desirable advance in the art to provide an apparatus for determining failure of one or more capacitors in a capacitor bank which eliminates error signals resulting from system unbalance and manufacturing tolerance errors.

Further, other polyphase systems have component failure detection problems substantially similar to that of a high voltage wye capacitor bank. For example, in many high voltage transmission installations, reactor banks comprising air core inductor coils are often connected across the transmission lines and interconnected at a common neutral point. Such polyphase reactor banks may be either neutral grounded reactors or isolated neutral reactor banks and may be utilized to neutralize the capacitive current of the system to ground thereby neutralizing line capacitance and/or reducing fault current to a value that will not sustain an arc. Failure of one of the coils of the reactor bank typically results from shorting across one or more turns or layers of the coil. Such a failure produces a neutral point displacement because of the change of the reactance of the coils. Further, failure to detect the shorting of a winding will ultimately result in a catastrophic failure of the inductor.

Similarly, another polyphase system in which it is also difficult to detect component failure, is a multi-phase generator. Typically, the primary windings of a multi-phase generator are connected to a common neutral point. The typical failure of such a polyphase generating system is that the insulation of the primary windings or connected isolated phase bus deteriorates and a high resistance ground results. Such a high resistance ground is extremely difficult to detect since the operation of the generator is only marginally affected. However, failure to detect such a high resistance ground may ultimately result in continued breakdown of the insulation with resultant major damage.

Both the reactor bank and multi-phase generator polyphase systems have the same detection problems present in a capacitor bank. In particular, manufacturing tolerance error and system unbalance can cause error signals to be introduced at the neutral point which will obscure the signal present at the neutral point resulting from failure or change of one or more of the components of the system.

Accordingly, it would be a highly desirable advance in the art to provide an apparatus for detecting failure of one or more components of a polyphase system which eliminates error signals resulting from system unbalance or manufacturing tolerance errors of the components.

BRIEF DESCRIPTION OF THE INVENTION

In accordance with the present invention, an apparatus for measuring neutral displacement of a polyphase system resulting from failure or inadvertent change of one or more components of the polyphase system by eliminating neutral displacement caused by component tolerance error and system unbalance comprises sensing means for measuring the total neutral displacement at the neutral point and transmitting neutral displacement signals representative of the total neutral displacement. A first compensating means is provided for measuring the power system unbalance and transmitting power system unbalance compensating signals representative of and equal and opposite to that portion of the total neutral displacement caused by system unbalance. Also provided is a second compensating means for providing a component tolerance error compensating signal equal and opposite to the portion of the neutral displacement signal caused by component tolerance error. Summing means is provided for receiving and summing the neutral displacement signal, the power system unbalance compensating signal and the component tolerance compensating signal so that the portion of the neutral displacement signal caused by power system unbalance and component tolerance error are cancelled and so that the output signal of the summing means represents only that portion of the neutral displacement signal resulting from failure of one or more components.

The first and second compensating means provide a means for eliminating from the neutral displacement signal those components of that signal caused by system unbalance and component tolerance error. Thus, the output signal of the summing amplifier represents that portion of the neutral displacement caused by a failure or inadvertent change of one or more of the components of the system, and thus, the failure of one or more components can be accurately determined without error signals masking the signal caused by component failure. Accordingly, the present invention provides decided advantages over the prior art systems since the output signal of the summing amplifier provides an accurate representation of the magnitude of and the severity of the damage to or change of the components of the system.

First detector means may also be provided to detect the magnitude and time duration of the output signal of the summing means and to provide a warning signal when the magnitude and time duration of the output signal exceeds predetermined values indicative of failure of a component of the system requiring immediate attention.

Further, second detector means may be provided for detecting the magnitude and time duration of the output signal of the summing means and to automatically disconnect the polyphase system thereby protecting the system from further damage when the magnitude and time duration of the output signal exceeds predetermined values indicative that immediate disconnection of the system is necessary.

Further, the first compensating means may include means for adjusting the phase vector of the system unbalance compensating signal and the component tolerance error compensating signal in case the phase vector of those signals is not in phase with those portions of the neutral displacement signal resulting from system unbalance and component tolerance error.

Thus, it is a primary object of the present invention to provide an apparatus for measuring neutral displacement of a polyphase system caused by component failure or inadvertent change by eliminating from the neutral displacement signal that portion of the neutral displacement signal resulting from system unbalance and component tolerance errors.

It is a further object of the present invention to provide an apparatus for measuring neutral displacement of a polyphase system resulting from component failure and provide a warning signal or sequences of warning signals indicating component failure and/or automatically disconnect the polyphase system when the component failure is of sufficient magnitude to indicate immediate danger to the system.

Yet another object of the present invention is to provide an apparatus for measuring neutral displacement of a polyphase system resulting from component failure having means to adjust the magnitude and phase of the compensating signals so that that portion of the neutral displacement signal caused by system unbalance and component tolerance error are cancelled.

These and other objects, advantages, and features of the subject invention will hereinafter appear, and for the purposes of illustration, but not of limitation, exemplary embodiments of the present invention are illustrated in the accompanying drawings.

BRIEF DESCRIPTION OF THE DRAWINGS

FIG. 1 is a block schematic diagram of a preferred embodiment of the control circuitry of the present invention.

FIG. 2 is a schematic diagram of one embodiment of the neutral displacement sensing means and system unbalance sensing means used in connection with the present invention.

FIG. 3 is a schematic circuit diagram of a preferred embodiment of the compensating module of the present invention.

FIG. 4 is a schematic circuit diagram of a preferred embodiment of the conditioning module of the present invention.

FIG. 5 is a schematic circuit diagram of a preferred embodiment of the alram timer module of the present invention.

FIG. 6 is a schematic circuit diagram of the preferred embodiment of the trip timer module of the present invention.

FIG. 7 is a schematic circuit diagram of a preferred embodiment of the alarm control module of the present invention.

FIG. 8 is a schematic circuit diagram of a preferred embodiment of a trip control module of the present invention.

FIG. 9 is a schematic diagram of a typical multi-phase reactor bank having sensing means in accordance with the present invention.

FIg. 10 is a schematic diagram of a multi-phase generator system having sensing means in accordance with the present invention.

FIGS. 11, 12, and 13 illustrate prior art sensing means used in multi-phase wye capacitor banks.

FIG. 14 is a schematic illustration of the arrangement of FIGS. 3-8.

DETAILED DESCRIPTION OF THE PREFERRED EMBODIMENT

With reference to FIGS. 1 and 2, a multi-capacitor wye capacitor bank 10 is generally schematically illustrated as three groups of capacitors 12, 14 and 16 connected to high voltage transmission lines 18, 20 and 22. While capacitor groups 12, 14 and 16 are schematically illustrated as a single capacitor, typically in a high voltage capacitor bank, a plurality of capacitors could be connected in series and/or parallel combinations across the transmission lines. Accordingly, it should be understood that capacitor groups 12, 14 and 16 have been schematically illustrated as a single capacitor merely for convenience and should not be interpreted to be indicative of the arrangement of capacitors in a multi-capacitor high voltage wye capacitor bank.

One side of capacitor groups 12, 14 and 16 are connected at a common neutral point 24. Between the opposite side of capacitor groups 12, 14 and 16 and transmission lines 18, 20 and 22 are connected switches 26, 28 and 30 which are ganged and actuated by actuating mechanism 32 schematically illustrated as a circle in FIG. 2. Actuating mechanism 32 may take the form of any electromechanical component such as a solenoid, relay or switch operating motor which may be used to operate switches 26, 28 and 30.

Connected to neutral point 24 is potential measuring device 34 which comprises resistor 36 and transformer 38. Output terminals 40 and 42 of the secondary winding of transformer 38 are connected to input terminals 40' and 42' of neutral displacement signal conditioning means 44 illustrated in FIG. 1. The voltage across terminals 40 and 42 is proportional to and representative of the neutral displacement voltage at neutral point 24 resulting from system voltage unbalance, capacitor tolerance unbalance, failure or inadvertent change of any capacitors in capacitor bank 10 and harmonics. Thus, this output may be termed the neutral displacement signal.

Also connected to transmission lines 18, 20 and 22 are potential transformers 50, 52 and 54. The primary windings 56, 58 and 60 of potential transformers 50, 52, and 54 have one side connected to a separate one of transmission lines 18, 20 and 22, and the other side of the primary windings 56, 58 and 60 are connected to ground. The secondary windings 62, 64 and 66 of transformers 50, 52 and 54 are connected in series so that terminals 70 and 72 provide an output voltage equaling the sum of the voltages across secondary windings 62, 64 and 66. This output voltage across terminals 70 and 72 is proportional to and representative of the system voltage unbalance across transmission lines 18, 20 and 22, and this may be called the system unbalance signal.

Also connected between secondary windings 62 and 64 is terminal 74. The voltage across terminals 70 to 74 is proportional to and representative of the voltage upon transmission line 22 and provides a reference signal the purpose of which will hereinafter be described. Terminals 70 and 72 are connected to terminals 70' and 72' of system voltage unbalance control 76 illustrated in FIG. 1. Also, terminals 70 and 74 are connected to input terminals 70' and 74' of capacitor bank unbalance control 78. The output of neutral displacement signal conditioning means 44, system voltage unbalance control 76 and capacitor bank unbalance control 78 are connected through filter 80 to summing amplifier 82. The output of summing amplifier 82 is connected to level detectors 84 and 86 in trip level module 88 and alarm level module 90 respectively. The output of level detectors 84 and 86 are fed into a timer 92 and 94 respectively and the output of timers 92 and 94 are fed into switch control module 96 and alarm control module 98 respectively.

As previously indicated, potential measuring device 34 is connected to neutral point 24 to measure the neutral displacement voltage and provide a neutral displacement signal. Resistor 36 is of sufficiently high resistance to prevent significant current flow, and thus substantially isolates the neutral point 24 from gound. In normal operation switches 26, 28 and 30 are closed thus connecting wye capacitor bank 10 across transmission lines 18, 20 and 22. Assuming perfect conditions, i.e., that there is no voltage or load unbalance between transmission lines 18, 20 and 22, that the total capacitance of capacitance groups 12, 14 and 16 is identical, and no capacitors have failed in wye capacitor bank 10, the primary frequency voltage at neutral point 24 should remain at a zero value. However, a number of factors can cause the voltage at neutral point 24 to reach some nominal value. For example, system voltage unbalance may be introduced into the system as a result of unbalance caused by nontransposition of conductors in transmission lines 18, 20 and 22, and as a result of system load unbalance across transmission lines 18, 20 and 22. Further, it is impossible to manufacture capacitors without some variation in the capacitance of the unit. Such manufacturing tolerance errors can introduce an error voltage signal at neutral point 24 since the capacitance of the capacitor groups 12, 14 and 16 is not identical. Further, a signal may be introduced at neutral point 24 as a result of failure of one or more capacitors in capacitor bank 10. All of these voltage signals will exist at neutral point 24 and will be measured by potential measuring device 34.

To eliminate the error voltage signals existing at neutral point 24 resulting from system unbalance, potential transformers 50, 52 and 54 are connected across lines 18, 20 and 22 respectively. The total output voltage across terminals 70 and 72 is a system unbalance signal proportional to and representative of the total system voltage unbalance across lines 18, 20 and 22. The proportion of the voltage signal across terminals 70 and 72 to the system voltage unbalance will depend upon the turns ratio between the primary and secondary windings of potential transformers 50, 52 and 54.

To compensate for capacitor tolerance error, a fixed reference signal is provided across terminals 70 and 74 to provide a reference signal to be controlled to offset the capacitor bank tolerance error voltage.

It should be expressly understood that it is not mandatory to the present invention that a potential measuring device 34 or potential transformers 50, 52 and 54 be utilized to provide the necessary signals. Any type of sensing means capable of providing the necessary signals will suffice. For example, any means of determining the neutral displacement at point 24 such as a current sensing device or a potential transformer as well as many other sensing devices will adequately perform the function of providing a neutral displacement signal. Further, a summing amplifier and a potential measuring device could be substituted for the potential transformers 50, 52, and 54 to provide the system unbalance signals. The reference signal need not even be provided by the transmission line and any source of reference signal such as a power supply could be used.

As previously indicated, the neutral displacement signal across terminals 40 and 42 is fed into neutral displacement signal conditioning means 44 by input terminals 40' and 42'. Neutral displacement signal conditioning means 44 is provided to reduce noise and grounding problems and isolate the potential measuring device 34 from the summing amplifier 82 thereby conditioning the neutral displacement signal for transmission to the summing amplifier 82.

The capacitor bank unbalance control 78 contains circuitry to isolate the potential transformer 50 from the summing amplifier 82 and to vary both the phase and amplitude of the voltage across terminals 70 and 74 to produce a compensating signal that is exactly equal and opposite in phase and amplitude to that portion of the neutral displacement signal resulting from capacitor bank manufacturing tolerance error.

The system to the unbalance control receives the system unbalance signal across terminals 70 and 72 which is representative and proportional to the system voltage unbalance across transmission lines 18, 20 and 22. The system voltage unbalance control isolates the transformers 50, 52 and 54 from the summing amplifier 82 and also may be used to adjust the amplitude of the signal voltage until it produces a compensating signal that is exactly equal to and opposite to that portion of neutral displacement signal caused by system unbalance.

The output compensating signals of capacitor bank unbalance control 78 and system voltage unbalance control 76, and the conditioned neutral displacement signal output of neutral displacement signal conditioning means 44 are fed through filter 80 which removes harmonic frequencies above and below the primary frequency of transmission of transmission lines 18, 20 and 22 thus eliminating error voltages that might result from such harmonic frequencies. The filter signals are then fed into the summing amplifier which subtracts from the neutral displacement signal the compensating signals provided by the capacitor bank unbalance control 78 and the system voltage unbalance control 76 so that the output of summing amplifier 82 represents only that portion of the neutral displacement signal caused by failure of any of the capacitors in capacitor bank 10. Thus, error signals corresponding to that portion of the neutral displacement signal caused by system voltage unbalance and capacitor tolerance unbalance are eliminated.

The output of summing amplifier 82 is then fed into level detectors 84 and 86 and then to timers 92 and 94. Level detectors 84 and 86 detect the magnitude of the output signal of summing amplifier 82 and actuate timers 92 and 94 when that magnitude exceeds predetermined values. Timers 92 and 94 are provided in the circuit to prevent short duration transient fluctuations from accidentally triggering switch control module 96 and alarm control module 98. Thus, only continuous output signals from summing amplifier 82 resulting from failure of one or more capacitors in capacitor bank 10 will cause actuation of switch control module 96 and alarm control module 98.

Alarm control module 98 is adapted to provide a warning signal to indicate minor failure of one or more capacitors in the capacitor bank which would require maintenance or repair. Switch control module 96 causes actuating mechanism 32 to operate to open switches 26, 28 and 30 thereby disconnecting capacitor bank 10 from transmission lines 18, 20 and 22. Thus, if the magnitude of the output of summing amplifier 82 is sufficiently great to indicate that cascading failure of the capacitors in capacitor bank 10 is likely to occur, switch control module 96 causes actuating mechanism 32 to immediately disconnect the capacitor bank 10 from the transmission lines thereby protecting the remaining capacitors in capacitor bank 10.

FIGS. 3, 4, 5, 6, 7, and 8 illustrate a more detailed schematic circuit of a preferred embodiment of the present invention which may be utilized in conjunction with the circuitry illustrated in FIG. 2 or any other appropriate circuitry connected to a polyphase system.

With reference to FIG. 3, the system unbalance signals from terminals 70 and 72 of potential transformers 50, 52 and 54 may be applied to terminals 70'' and 72'' of compensating module 100. Terminals 70'' and 72'' are connected across the primary winding 104 of isolating transformer 102 which isolates the compensating module circuitry from the potential transformers 50, 52 and 54. The secondary winding 106 of isolating transformer 102 is connected to a narrow 60 Hz band pass filter 108 comprising operational amplifier 110, resistors 112, 114, 116, 118, 120, and 122, and capacitors 124 and 126. Band pass filter 108 is provided to filter out harmonic frequency voltage appearing at terminals 70'' and 72''. Adjustable resistor 128 provides a means of adjusting the amplitude of the output from bank pass filter 108 so that the output voltage on line 129 can be adjusted to exactly compensate for the portion of the neutral displacement signal due to system unbalance.

The reference signal from terminals 70 and 74 of potential transformer 50 is applied to terminals 70'' and 74'' of compensating module 100. The primary winding 132 of isolating transformer 130 is connected across terminals 70'' and 74''. Isolating transformer 130 isolates the circuitry of the compensating module 100 from transformer 50. The secondary winding 134 of isolating transformer 130 is center tapped to feed the phase shifting means 140. Phase shifting means 140 comprises resistors 142 and 144, capacitors 146 and multiple switch arrangement 148. Multiple switch arrangement 148 allows a course adjustment of the phase of the reference signal on terminals 70'' and 74'' of plus or minus 90° and plus or minus 180°. Variable resistor 142 provides a fine adjustment of the phase from 0° to 90°. Thus, by the combination of switch arrangement 148 and variable resistor 142, the phase of the reference signal can be adjusted by 360°. The amplitude of the reference signal from the phase shifting means 140 can be adjusted by adjustable resistor 150 to provide a capacitor tolerance unbalance compensating signal exactly equal and opposite to in both magnitude and phase to the portion of the neutral displacement signal caused by manufacturing tolerance error in the capacitors in capacitor bank 10. This capacitor tolerance unbalance compensating signal is Conducted by conductor 152 to conditioning module 200 illustrated in FIG. 4.

With reference to FIG. 4, the neutral displacement signal from output terminals 40 and 42 of potential measuring device 34 is applied to terminals 40'' and 42'' connected across the primary winding 204 of isolating transformer 202 of input conditioning module 200. Variable resistor 206 is connected across terminals 40' and 42' to provide an adjustable load on the secondary winding of transformer 38 of potential measuring device 34. Isolating transformer 202 provides isolation from and noise supression of the neutral displacement signal from potential measuring device 34. The second winding 208 of isolating transformer 202 is connected to summing amplifier means 210 comprising operational amplifier 212, resistors 214, 216, 218, 220, 222, and 224 and switches 226, 228, and 230. The summing amplifier means 210 is provided to add or sum the neutral displacement signal provided at terminals 40' and 42' and the system unbalance compensating signal provided on conductor 129 and the capacitor tolerance unbalance compensating signal on line 152 so that the output signal on conductor 232 represents only that portion of the neutral displacement signal resulting from failure of one or more capacitors in the capacitor bank 10, and that portion of the neutral displacement signal caused by system unbalance and capacitor tolerance unbalance has been eliminated.

The output signal of summing amplifier means 210 is then fed to a band pass filter 240 comprising operational amplifier 242, capacitors 244 and 246 and resistors 248, 250, 252, 254, 256 and 258. Band pass filter 240 is a narrow 60 Hz filter to eliminate the effects of harmonic frequency error voltages appearing at the output of the summing amplifier means 210. The output of band pass filter 240 is capacitively coupled to transformer 260 by capacitor 262 to eliminate any DC components. The output of transformer 260 is rectified by means of diodes 264 and 266, filtered by resistor 268 and capacitor 270, and divided by resistor 272 and 274. The DC signal at test point 276 represents the DC voltage equivalent to and proportional to the voltage signal at the capacitor bank neutral point 24 resulting from loss of individual capacitor units within capacitor bank 10. A meter 280 and a calibrating adjusting resistor 282 are connected from test point 276 to signal common ground line 284 through normally closed switch contacts 286. The scale of meter 280 is calibrated in volts AC to give a direct reading of the neutral displacement voltage due to loss of capacitor units within the capacitor bank. A relay 288 is provided to set up a calibrating circuit hereinafter described whereby the meter is used to read the reference voltage in the trip timer module 300 (FIG. 6) and alarm timer module 400 (FIG. 7). Relay 288 is connected to and operates switch contacts 286.

Conditioning module 200 also includes an overvoltage bypass means 289 comprising resistor 290, bridge rectifier 292 and zener diode 294. The purpose of overvoltage bypass means 288 is to provide redundant backup protection in the event of component failure in the conditioning module 200 or the trip timer module 300. When the neutral displacement voltage signal is sufficiently large to cause zener diode 294 to conduct, a trip signal will be transmitted by conductor 522 to control module 500. The effect of the trip signal will be described hereinafter.

Input 295 of conditioning module 200 is the signal common ground. Input 296 and input 297 are +13 volts and −13 volts respectively from a regulated power supply (not shown). Input 298 is connected to a switch (not shown) which may be actuated when capacitor bank 10 is disconnected from transmission lines 18, 20 and 22 to short summing amplifier means 210 and bridge rectifier 292 to ground to prevent spurious signals from the capacitor bank from causing damage to the control circuitry.

With reference to FIG. 6, the output at test point 276 of conditioning module 200 is transmitted by conductor 299 to operational amplifier 302 of trip timer module 300. Operational amplifier 302, resistors 304 and 306, and switch 308 comprise a direct current comparator means 310 used to compare the DC voltage output of the conditioning module 200 against a reference voltage produced by adjustable resistor 306. When the DC input voltage from the conditioning module 200 exceeds the reference voltage level provided by adjustable resistor 306, the output voltage of operational amplifier 302 will change rapidly. Switch 308 is used to energize relay 288 in conditioning module 200 thus switching switch contacts 286 allowing the reference voltage setting of adjustable resistor 306 to be read directly on meter 280 through conductors 312 and 314 which interconnect conditioner module 200 and trip timer module 300. Consequently, actuation of switch 308 permits the reference voltage at which operational amplifier 302 will change its output to be read directly on meter 280 thereby facilitating adjustment of the reference voltage.

An oscillator circuit 315 is provided in trip timer module 300 comprising operational amplifier 316, capacitor 318 and resistors 320, 322, 324, 326, 328, 330, 332, and 334. A voltage ramp signal is generated by resistors 328 and 330 and capacitor 318. A reference voltage is set by resistors 320, 322, and 332. When the ramp voltage exceeds the reference voltage, the output of operational amplifier 316 will abruptly increase causing capacitor 318 to be discharged and a new ramp voltage to be generated. The output from the oscillator circuit is a non-symmetrical square wave which is fed to integrated circuit 340 by conductor 336. Integrated circuit 340 is a quadruple two input NAND gate. The logic of integrated circuit 340 is arranged so that the DC input voltage to operational amplifier 302 must exceed the reference voltage at resistor 306 at the same time the output signal on conductor 336 from the oscillator circuit is present before the oscillator signal will be gated to integrated circuit 342. Integrated circuit 342 is a binary coded decade counter. When decade counter integrated circuit 342 reaches a binary coded eight count, the voltage on conductor 344 will increase abruptly to activate trip control module 500 (FIG. 7) hereinafter described. If, at any time before the decade counter integrated circuit 342 reaches a binary eight count, the output voltage of comparator means 310 returns to its original state, the counter will instantaneously reset to zero. Thus, integrated circuit 342 prevents transient pulses from accidentally activating trip control module 500.

Integrated circuit 350 is a voltage regulator used to convert +13 volts from the power supply at input 352 to a regulated +5 volts for use in the logic circuit. Input 353 is signal common ground. Inductor 354 and capacitors 356, 357, 358 are used to filter the supply voltage.

With reference to FIG. 5, the output signal on conductor 299 from summing amplifier means 210 of conditioning module 200 is also connected to operational amplifier 402 of alarm timer module 400. Operational amplifier 402, resistors 404 and 406 and switch 408 comprise a direct voltage comparator means 410 which operates in substantially the same manner as direct voltage comparator means 310 in trip timer module 300. A reference voltage is provided by adjustable resistor 406, and when the input voltage signal on line 299 exceeds the reference voltage, the output of operational amplifier changes abruptly.

Switch 408 is also utilized to activate relay 288 so that the reference voltage setting of resistor 406 can be directly read on meter 280. Switch 408 is connected to conductor 312 and is also interconnected to switch 308 by a conductor 412 so that switch 408 is disconnected from the meter circuit if switch 308 is actuated. Thus, it is possible to read only one reference voltage at a time.

An oscillator circuit is not provided in alarm timer module 400, but rather, the oscillator circuit 315 in trip timer module 300 is connected to alarm timer module 400 by conductor 414. Thus, the output signals of oscillator circuit 315 are applied on conductor 414 and conductor 416 to integrated circuit 420 of alarm timer module 400. Integrated circuit 420 is a quadruple two input NAND gate and the logic of integrated circuit 420 is arranged so that the direct current input voltage to operational amplifier 402 must exceed the reference voltage on resistor 406 at the same time the output signal on line 416 from the oscillator circuit 315 is present to allow the oscillator signals to be gated to integrated circuit 422.

Integrated circuit 422 is also a binary coded decade counter, and when integrated circuit 422 reaches a binary coded eight count after the oscillator signal is gated to integrated circuit 422, the voltage on conductor 424 will change abruptly thus activating the alarm control module 600 (FIG. 8) as will hereinafter be described. If, at any time integrated circuit 422 is counting and the operational amplifier 402 returns to its original state as a result of the input signal falling below the reference voltage, the counter will instantaneously reset to zero, thus precluding an output signal on conductor 424. Consequently, integrated circuit 422 prevents transient pulses from activating alarm control module 600.

Alarm timer module 400 also has an integrated circuit voltage regulator comprising integrated circuit 430 which converts the +13 volts supply voltage at input 432 to a regulated +5 volts supply. Input 433 is signal common ground. Inductor 434 and capacitors 436, 438, and 440 are used to filter the voltage input.

With reference to FIG. 7, trip control module 500 activates capacitor bank switch operating mechanism 32 in FIG. 2. A magnetic latching relay 502 provides the electromechanical means of actuating operating mechanism 32. Once operated, relay 502 latches in an actuated condition until reset by actuation of switch 504. An indicator lamp 506 provides a visual means of indicating when relay 502 has been actuated. An input signal on conductor 344 from trip timer module 300 biases the base of transistor 506 causing transistor 506 to switch on to a conducting condition. The switching of transistor 506 in turn causes integrated circuit 508 to gate a signal to the base of transistor 510 thus switching transistor 510 to a conducting state. In turn, the switching of transistor 510 biases the base of transistor 512 causing transistor 512 to switch to a conducting state thereby causing relay 502 to actuate. Diodes 514 and 516 are inserted into the circuit to provide transient suppression.

Integrated circuit 508 is an opto-isolator used to interface the five volt logic with the remainder of the circuitry. Integrated circuit 520 is connected to overvoltage bypass means 289 in conditioner module 200 (FIG. 4) by conductors 522 and 524. As indicated previously, when the neutral displacement signal applied on terminals 40' and 42' exceeds the firing voltage of zener diode 294, zener diode 294 switches to an "on" condition and the signal is applied through lines 522 and 524 to integrated circuit 520. Integrated circuit 520 is an opto-isolator used to interface the input circuit with the remainder of the circuitry. The signal applied to integrated circuit 520 causes transistors 510 and 512 to switch to a conducting condition thereby actuating relay 502. Resistor 526 and capacitor 528 are provided to give a time delay of about one second to avoid false tripping of relay 502 as a result of switch yard switching noise and other extraneous transient inputs on terminals 40 and 42'.

Inductors 530 and 532 and capacitors 534 and 536 are provided to filter the supply voltage of +13 volts applied at input 538 and −13 volts applied at input 540. Input 542 is the signal common ground line.

With reference to FIG. 8, the output from binary coded decade counter integrated circuit 422 of alarm timer module 400 is fed into alarm control module 600 by conductor 424. When an output signal is present in conductor 424, the base of transistor 602 is biased by resistor 604 to switch to a conducting state thereby applying a signal to integrated circuit 606. Integrated circuit 606 in turn gates the signal to bias the base of transistor 608 thereby causing transistor 608 to switch to a conducting state. The switching of transistor 608 biases the base of transistor 610 causing transistor 610 to switch to a conducting state. When transistor 610 switches, relay 612 is actuated and indicator lamp 614 is illuminated. Relay 612 is a latching relay and can only be reset by actuation of switch 616. Diode 618 and 620 are provided to suppress transients.

Relay 612 may be used to operate a warning system such as a warning bell or buzzer or warning indicator light to indicate when there exists a neutral displacement signal of sufficient magnitude and time duration to cause concern. Inductor coils 622 and 624 and capacitors 626 and 628 are provided to filter the input voltage of −13 volts at input 630 and −13 volts at input 632. Input 634 is signal common ground.

Operation of the embodiment illustrated in FIGS. 3, 4, 5, 6, 7, and 8 is as follows. Assuming there has been a failure of one of the capacitors in capacitor bank 10 in FIG. 2, and assuming there is a system voltage unbalance across transmission lines 18, 20 and 22 and capacitor tolerance error, a neutral displacement signal will exist at terminals 40 and 42 corresponding to the voltages at the neutral point 24 caused by system unbalance, capacitor tolerance error, and capacitor failure. This signal is fed into conditioner module 200 at terminals 40' and 42' isolated by isolating transformer 202 and applied to summing amplifier means 210.

Similarly, the signal existing across terminals 70 and 72 of potential transformers 50, 52, and 54 represents the system voltage unbalance across transmission lines 18, 20 and 22. This system unbalance signal is fed into compensating module 100 (see FIG. 3) at terminals 70'' and 72'', isolated by isolating transformer 102, filtered by band pass filter 108 to filter out harmonic frequency voltages, and adjusted by adjustable resistor 128 so that the output system unbalance compensating signal on conductor 129 is exactly equal and opposite in magnitude to that portion of the neutral displacement signal caused by system voltage unbalance. A phase shifting means of the same type as phase shifting means 140 may also be incorporated to adjust the phase of the system unbalance compensating signal if phase shifting is a problem. However, typically, the phase of the two signals will track.

Similarly, the reference voltage signal across terminals 70 and 74 is applied to terminals 70'' and 74'' of compensating module 100, isolated by isolating transformer 130, and fed into phase shifting means 140. Actuation of multiple switch arrangement 148 permits course phase adjustment of ±180° and ±90° and adjustable resistor 142 permits a fine adjustment of phase between 0° and 90° so that the phase of the output signal from phase shifting means 140 is exactly opposite to the phase of that portion of the neutral displacement signal caused by capacitor tolerance unbalance. Adjustable resistor 150 permits the magnitude of the compensating signal to be adjusted until it is exactly equal and opposite in magnitude to the portion of the neutral displacement signal caused by a capacitor bank unbalance. This capacitor tolerance unbalance compensating signal is applied through conductor 150 to summing amplifier means 210 by conductor 152.

Calibration of the system unbalance signal is achieved by taking advantage of the fact that the system unbalance signal at terminals 70 and 74 and the neutral displacement signal at terminals 70 and 72 will track for all conditions of unbalance. Thus, by knowing the turns ratio of the primary and secondary windings of transformers 50, 52 and 54 and the voltage of the potential measuring device 34, adjustable resistor 128 can be adjusted and calibrated at the factory by merely applying a calculated value of reference voltage at the inputs to the system.

Once the adjustable resistor 128 has been calibrated, adjustment of the capacitor bank unbalance control follows easily. When the apparatus is connected to the transmission lines, and after all capacitors have been checked to determine that all capacitors are functioning properly, any error voltage existing at the capacitor bank neutral point 24 must be due to capacitor unit unbalance. At this time, phase shifting means 140 and adjustable resistor 150 can be adjusted to cancel out the capacitor tolerance error signal. Thereafter, any output from summing amplifier means 210 corresponds to that portion of the neutral displacement signal caused by failure of one or more capacitors in the capacitor bank.

This output signal from the summing amplifier means 210 is then filtered by band pass filter 240, rectified by diodes 264 and fed by conductor 299 to trip timer module 300 and alarm timer module 400. The magnitude of the neutral displacement signal caused by capacitor unit failure is visually indicated on meter 280.

The rectified output of summing amplifier means 210 is then compared by direct voltage comparator means 310 in trip control module 300 and direct voltage comparator means 410 in alarm timer module 400 to the reference voltages set by adjustable resistors 306 and 406 respectively. The reference voltages set by adjustable resistors 306 and 406 determines the voltage at which the signal will be gated through to the trip control module 500 and the alarm control module 600.

Typically, the reference voltage of adjustable resistor 406 is less than the reference voltage of resistor 306 since it is desirable to provide a warning signal in cases where the overvoltage caused by capacitor unit failure is not of sufficient magnitude to result in cascading failure. However, the reference voltage set by adjustable resistor 306 is that voltage at which it is desired to immediately remove the capacitor bank from the system to avoid cascading failure. Further, additional alarm timer modules and alarm control modules may be provided so that a sequence of warning signals are provided as the output of the summing amplifier means 210 increases.

As indicated previously, meter 280 is calibrated in terms of volts AC at neutral point 24. However, as previously described, by actuation of switches 308 and 408 meter 280 can be utilized to set the reference voltages established by resistors 306 and 406. Thus, to set the reference voltage on resistor 306, switch 308 is actuated and adjustable resistor 306 is adjusted until the desired reference voltage is indicated in meter 280. Thereafter, when the rectified output signal from summing amplifier mens 210 reaches this reference voltage level, operational amplifier 302 will change states. In the same manner, the reference voltage of resistor 406 can be adjusted by actuating switch 404.

Integrated circuits 342 and 422 in trip timer module 300 and alarm timer module 400 respectively are provided to time the duration of the output signal from summing amplifier means 210 so that extraneous transient fluctuation from sources other than capacitor unit failure do not inadvertently trigger the trip control module 500 or the alarm control module 600. Thus, once an output of sufficient magnitude and time duration is provided by summing amplifier means 210, a signal will be applied on conductors 344 and 424 to trip control module 500 and alarm control module 600 respectively thereby actuating the control circuits therein. Actuation of alarm control module 400 results in a warning signal being transmitted so that immediate corrective action may be taken without removing the capacitor bank from the system. However, an output signal on conductor 344 actuating trip control module 500 causes the capacitor bank to be automatically removed from the transmission lines by actuating mechanism 32 opening switches 26, 28 and 30.

An additional safety circuit is provided by overvoltage bypass means 289 in conditioning module 200. Overvoltage bypass means 289 permits the operation of trip control module 500 even if there is failure of one or more of the components in any of the circuitry preceding trip control module 500. Zener diode 294 is selected so that if there is an input voltage of sufficient magnitude to indicate that damage to the capacitors in the capacitor bank might result, zener diode 294 will conduct and a signal will be conducted through line 522 to integrated circuit 520 in trip control module 500 resulting in the actuation of relay 502 as previously described. Thus, the capacitor bank is protected even if there is a failure of any of the components which would preclude a signal from being applied to the trip control module through conductor 344.

With reference to FIG. 9, the embodiments illustrated in FIG. 1 or FIGS. 3, 4, 5, 6, 7, and 8 may be easily adapted to be used in conjunction with a reactor bank 700 connected across the transmission lines 702, 704, and 706. The neutral displacement of neutral point 708 can be measured by a variety of sensing means such as a potential measuring device or a current measuring device generally illustrated by box 710. The neutral displacement signal at terminals 712 would correspond to the neutral displacement of neutral point 708 resulting from system unbalance, inductor tolerance error and failure of one or more of the inductors in reactor bank 800. This signal could be applied in the same manner as the neutral displacement signal from the capacitor bank potential measuring device 34 to the circuitry of the present invention.

Similarly, a measuring means 714 could be provided to measure the system voltage unbalance in the same manner as the transformers 50, 52 and 54 in FIG. 2. The outputs 716 and 718 from measuring means 714 would provide a system unbalance signal and reference signal which could be applied to the circuitry of the present invention. Consequently, it can be seen that the present invention may be easily adapted to be used to determine component failure of a reactor bank.

With reference to FIG. 10, a three-phase generator is schematically illustrated at 800. The primary windings 802 are connected at a neutral point 804. A neutral displacement measuring means 806 similar to the potential measuring device 34 in FIG. 2 may be used to measure neutral point displacement. The output across terminals 808 may be applied to a conditioning means in accordance with the present invention. Similarly, system voltage unbalance can be measured by measuring means 810 and the system unbalance signal and reference signal at terminals 812 and 814 applied to compensating module in accordance with the present invention. Accordingly, it may be seen that the present invention may easily be adapted to determine component failure of a multi-phase generator.

Accordingly, it should be apparent that the present invention may be utilized with a variety of polyphase systems in addition to those described herein to accurately determine failure of one or more components of the polyphase system.

It should be further understood that various changes, modifications and variations of the subject invention may be taken without departing from the spirit and scope of the present invention as defined in the appended claims.

I claim:

1. An apparatus for measuring electrical neutral displacement of a polyphase system utilized in an electrical power system at the neutral point of the polyphase system resulting from failure or inadvertent change of one or more components of the polyphase system by eliminating neutral displacement resulting from component tolerance error and power system unbalance comprising:

sensing means for measuring the total neutral displacement at the neutral point and for transmitting a neutral displacement signal representative of the total neutral displacement;

first compensating means for measuring the power system unbalance and transmitting a power system unbalance compensating signal representative of and equal and opposite to the portion of the neutral displacement signal corresponding to power system unbalance, said first compensating means including first isolating means for isolating the first compensating means from the power system, and first filtering means for filtering out harmonic frequencies above and below the primary frequency of the power system;

second compensating means for providing a component tolerance error compensating signal equal and opposite to the portion of the total neutral displacement signal corresponding to component tolerance error, said second compensating means including second isolating means for isolating the second compensating means from the power system, and second filtering means for filtering out harmonic frequencies above and below the primary frequency of the power system;

summing means for receiving and summing the total neutral displacement signal, the power system unbalance compensating signal and the component tolerance error compensating signal so that that portion of the neutral displacement signal caused by power system unbalance and component tolerance error are cancelled and the output signal of said summing means represents that portion of the neutral displacement signal resulting from failure or inadvertent change of one or more components;

first detection means for detecting the magnitude and time duration of the output signal of the summing means and providing a warning signal when the magnitude and time duration of the output signal of said summing means exceeds predetermined values, said first detection means comprising:
  reference signal means for providing a reference signal including means to adjust the reference signal; and
  comparator means for comparing the reference signal and the output signal of said summing means and providing a warning signal when the magnitude of the output signal of said summing means exceeds the magnitude of the reference signal;

second detection means for detecting the magnitude and time duration of the output signal of the summing means and automatically disconnecting the polyphase system from the power system when the magnitude and time duration of the output signal of the summing means exceeds predetermined values, said second detection means comprising:
  reference signal means for providing a reference signal including means to adjust the reference signal; and
  comparator means for comparing the reference signal and the output of said summing means and automatically disconnecting the polyphase system from the power system when the magnitude of the output signal of said summing means exceeds the magnitude of the reference signal.

2. An apparatus as claimed in claim 1, wherein the polyphase system is a floating neutral wye capacitor bank connected across the transmission lines of a multi-phase electric power system; and
  said sensing means comprises a potential measuring device; and
  the output signal of said summing means represents neutral displacement voltage caused by failure or inadvertent change of one or more capacitors in the capacitor bank.

3. An apparatus, as claimed in claim 1, wherein the polyphase system is a grounded neutral wye capacitor bank connected across the transmission lines of a multi-phase electric power system;
  said sensing means comprises a current measuring device; and
  the output signal of said summing means represents neutral displacement current caused by failure or inadvertent change of one or more capacitors in the capacitor bank.

4. An apparatus, as claimed in claim 1, wherein the polyphase system is a reactor bank connected across the transmission lines of a multi-phase electric power system, and the output signal of the summing means represents neutral displacement resulting from failure or inadvertent change of one or more of the inductors in the reactor bank.

5. An apparatus, as claimed in claim 1, wherein the polyphase system is a multi-phase electric generator having interconnected windings at a neutral point and the output signal of said summing means represents neutral displacement caused by failure or inadvertent change of one or more of the windings of the generator or connected bus conductors.

6. An apparatus, as claimed in claim 1, wherein said sensing means comprises a potential measuring device.

7. An apparatus, as claimed in claim 1, wherein said sensing means comprises a current measuring device.

8. An apparatus, as claimed in claim 1, wherein said first compensating means includes means for adjusting the phase vector of said power system unbalance compensating signal so that it is 180° opposite to the phase vector of that portion of the neutral displacement signal caused by power system unbalance.

9. An apparatus, as claimed in claim 1, wherein said second compensating means includes means for adjusting the phase vector of the component tolerance error compensating signal so that it is 180° opposite to the phase vector of that portion of the neutral displacement signal caused by component tolerance error.

10. An apparatus, as claimed in claim 1, wherein said first detection means further comprises:
  a meter means for visually indicating the magnitude of the output signal of the summing means; and
  calibrating means for permitting the magnitude of the reference signal to be visually indicated on the meter means so that the reference signal can be adjusted.

11. An apparatus, as claimed in claim 1, wherein said second detection means further comprises:
  a meter means for visually indicating the magnitude of the output signal of said summing means; and
  calibrating means for permitting the magnitude of the reference signal to be visually indicated on the meter means so that the reference signal can be adjusted.

12. An apparatus for determining failure or inadvertent change of one or more capacitors in a multiple capacitor wye capacitor bank connected between three transmission lines of a 60 cycle AC three-phase electrical power system comprising:
  sensing means for sensing the capacitor bank neutral displacement and transmitting a neutral displacement signal corresponding to the capacitor bank neutral displacement;
  measuring means for measuring the power system voltage unbalance between the three transmission lines and transmitting a power system unbalance signal corresponding to the power system voltage unbalance;
  first compensating means for receiving the power system unbalance signals and providing a first compensating signal equal and opposite to that portion of the neutral displacement signal caused by power system voltage unbalance, said first compensating means including first isolating means for isolating said first compensating means for said measuring means; and first filtering means for filtering out harmonic frequencies above and below the primary frequency of the power system;
  second compensating means for providing a second compensating signal equal and opposite to that portion of the neutral voltage displacement signal resulting from capacitor tolerance unbalance, said second compensating means including second isolating means for isolating said second compensating means from the power system, and second filtering means for filtering out harmonic frequencies above and below the primary frequency of the power system; and a summing amplifier for receiving and summing the neutral voltage displacement signal and the first and second compensating signals so that that portion of the neutral displacement signal caused by power system voltage unbalance and capacitor tolerance unbalance are cancelled and so that the output signal of said summing amplifier represents that portion of the neutral displacement signal resulting from failure or inadvertent change of one or more capacitors.

13. An apparatus, as claimed in claim 12, wherein said sensing means comprises a potential measuring device.

14. An apparatus, as claimed in claim 12, wherein said sensing means comprises a current measuring device.

15. An apparatus, as claimed in claim 12, further comprising first detection means for detecting the magnitude and time duration of the output signal of said summing amplifier and providing a warning signal when the magnitude and time duration of the output signal of said summing amplifier exceeds predetermined first values.

16. An apparatus, as claimed in claim 15, wherein said first detection means comprises:

reference signal means for providing a reference signal including means to adjust the reference signal; and comparator means for comparing the reference signal and the output signal of said summing amplifier and providing a warning signal when the mangitude of the output signal of said summing amplifier exceeds the magnitude of the reference signal.

17. An apparatus, as claimed in claim 16, further comprising:

a meter means for visually indicating the magnitude of the output signal of the summing amplifier; and calibrating means for permitting the magnitude of the reference signal to be visually indicated on the meter means so that the reference signal can be adjusted.

18. An apparatus, as claimed in claim 12, further comprising second detection means for detecting the magnitude and time duration of the output signal of said summing amplifier and automatically disconnecting the capacitor bank from the power system when the magnitude and time duration of the output signal of the summing amplifier exceeds predetermined second values.

19. An apparatus, as claimed in claim 18, wherein said second detection means comprises:

reference signal means for providing a reference signal including means to adjust the reference signal; and comparator means for comparing the reference signal and the output signal of said summing amplifier and automatically disconnecting the capacitor bank from the power system when the magnitude of the output signal of said summing amplifier exceeds the magnitude of the reference signal.

20. An apparatus, as claimed in claim 19, further comprising:

a meter means for visually indicating the magnitude of the output signal of said summing amplifier; and calibrating means for permitting the magnitude of the reference signal to be visually indicated on the meter means so that the reference signal can be adjusted.

21. An apparatus, as claimed in claim 12, wherein said measuring means comprises:

first, second, and third potential transformers, each having primary and secondary windings, one side of the primary windings of said first, second and third potential transformers each being connected to a separate one of the transmission lines and the other side of the primary windings being connected to ground; and the secondary windings of said potential transformers being connected in series so that the total voltage across said secondary windings is proportional to and represents power system voltage unbalance.

22. An apparatus, as claimed in claim 12, wherein said first compensating means includes means for adjusting the phase vector of said first compensating signal.

23. An apparatus, as claimed in claim 12, wherein said second compensating means includes means for adjusting the phase vector of said compensating signal.

24. An apparatus for determining failure of one or more capacitors in a floating neutral multiple capacitor wye capacitor bank connected between three transmission lines of a 60 cycle AC three-phase electrical power system comprising:

a potential measuring device comprising a resistor and a transformer connected in series between the capacitor bank neutral and ground, said transformer having outputs for providing a neutral displacement signal representative of the capacitor bank neutral displacement voltage;

a first, second and third potential transformers each having primary windings and secondary windings, one side of said primary windings of said first, second and third potential transformers each being connected to a separate one of the transmission lines, and the other side of said primary windings being connected to ground, said secondary windings being connected in series so that the total voltage across said series secondary windings represent the sum of the power system unbalance voltage;

means for sensing the output voltage across the secondary winding of the first potential transformer and providing an output signal;

a capacitor bank unbalance compensating means for receiving the output voltage across the secondary winding of the first potential transformer and providing a first compensating signal equal and opposite to that portion of the neutral displacement signal resulting from capacitor tolerance error;

a power system unbalance compensating means for receiving the output signal of said series secondary windings and providing a second compensating signal equal and opposite to that portion of the neutral voltage displacement signal corresponding to power system unbalance;

filter means for filtering out harmonic frequencies above and below the primary frequency of the electrical power system from the neutral voltage displacement signal, and said first and second compensating signals;

a summing amplifier for summing the filtered neutral displacement signal, and the first and second compensating signals so that that portion of the neutral displacement signal caused by power system voltage unbalance and capacitor tolerance unbalance is cancelled and so that the summing amplifier output signal represents the capacitor neutral voltage caused by failure or inadvertent change of one or more of the capacitors in the capacitor bank;

first detection means for detecting the magnitude of and time duration of said summing amplifier output and providing a warning signal when the magnitude and duration of said summing amplifier output exceeds predetermined first values;

second detection means for detecting the magnitude and time duration of the summing amplifier output and automatically disconnecting said capacitor bank from the transmission lines when the magnitude and duration of said summing amplifier output exceeds predetermined second values, which said second values exceed said first values.

25. An apparatus, as claimed in claim 24, wherein said first detection means comprises:

reference signal means for providing a reference signal, including means to adjust the reference signal;

comparator means for comparing the reference signal and the summing amplifier output signal and providing a warning signal when the magnitude of the output signal of the summing amplifier exceeds the magnitude of the reference signal.

26. An apparatus, as claimed in claim 25, further comprising:

a meter for visually indicating the magnitude of the output signal of the summing amplifier;

calibrating means for permitting the magnitude of the reference signal to be visually indicated on the meter so that the reference signal can be adjusted.

27. An apparatus, as claimed in claim 24, wherein said second detection means comprises:

reference signal means for providing a reference signal including means to adjust the reference signal;

comparator means for comparing the reference signal and the summing amplifier output signal and disconnecting said capacitor bank from the transmission lines when the magnitude of the output signal of the summing amplifier exceeds the magnitude of the reference signal.

28. An apparatus, as claimed in claim 27, further comprising:

a meter for visually indicating the magnitude of the output signal of the summing amplifier;

calibrating means for permitting the magnitude of the reference signal to be visually indicated on the meter so that the reference signal can be adjusted.

29. An apparatus, as claimed in claim 24, further comprising:

overvoltage bypass means for bypassing said summing amplifier and directly operating said second detection means so that the capacitor bank is disconnected from the transmission lines when the neutral displacement signal exceeds a predetermined magnitude.

30. An apparatus for measuring electrical neutral displacement of a polyphase system utilized in an electrical power system at a neutral point of the polyphase system resulting from failure or inadvertent change of one or more components of the polyphase system by eliminating neutral displacement resulting from component tolerance error and power system unbalance comprising:

sensing means for measuring the total neutral displacement at the neutral point and for transmitting a neutral displacement signal representative of the total neutral displacement;

compensating means for measuring the power system unbalance and transmitting a power system unbalance compensating signal representative of and equal and opposite to the portion of the neutral displacement signal corresponding to power system unbalance;

a summing amplifier for receiving and summing the total neutral displacement signal, and the power system unbalance compensating signal so that that portion of the neutral displacement signal caused by power system unbalance is cancelled and the output signal of said summing amplifier represents that portion of the neutral displacement signal resulting from failure or inadvertent change of one or more components.

* * * * *